US008620763B2

(12) United States Patent
Sullivan et al.

(10) Patent No.: US 8,620,763 B2
(45) Date of Patent: Dec. 31, 2013

(54) SYSTEM, METHOD AND COMPUTER PROGRAM PRODUCT FOR DEMAND-WEIGHTED SELECTION OF SALES OUTLETS

(75) Inventors: Thomas J. Sullivan, Santa Monica, CA (US); Isaac Lemon Laughlin, Los Angeles, CA (US); Tyson Fritz Nassauer, Los Angeles, CA (US); Michael Swinson, Santa Monica, CA (US)

(73) Assignee: Truecar, Inc., Santa Monica, CA (US)

( * ) Notice: Subject to any disclaimer, the term of this patent is extended or adjusted under 35 U.S.C. 154(b) by 76 days.

(21) Appl. No.: 13/291,544

(22) Filed: Nov. 8, 2011

(65) Prior Publication Data
US 2013/0117067 A1    May 9, 2013

(51) Int. Cl.
*G06Q 30/00* (2012.01)
(52) U.S. Cl.
USPC ............. 705/26.1; 705/14.69; 705/14.25; 705/14.46; 707/732
(58) Field of Classification Search
None
See application file for complete search history.

(56) References Cited

U.S. PATENT DOCUMENTS

| | | | | |
|---|---|---|---|---|
| 6,920,464 B2* | 7/2005 | Fox | | 707/732 |
| 2002/0156668 A1* | 10/2002 | Morrow et al. | | 705/8 |
| 2002/0156678 A1* | 10/2002 | Adams | | 705/14 |
| 2003/0018530 A1* | 1/2003 | Walker et al. | | 705/14 |
| 2003/0200134 A1* | 10/2003 | Leonard et al. | | 705/10 |
| 2003/0200143 A9* | 10/2003 | Walker et al. | | 705/14 |
| 2004/0078302 A1* | 4/2004 | Cooper et al. | | 705/27 |
| 2004/0093276 A1* | 5/2004 | Nishio | | 705/26 |
| 2004/0225569 A1* | 11/2004 | Bunnell | | 705/26 |
| 2005/0096963 A1* | 5/2005 | Myr et al. | | 705/10 |
| 2005/0144106 A1* | 6/2005 | Eder | | 705/36 |
| 2007/0094038 A1* | 4/2007 | Kling et al. | | 705/1 |
| 2007/0100680 A1* | 5/2007 | Kumar et al. | | 705/10 |
| 2007/0233587 A1* | 10/2007 | Unrath | | 705/36 R |
| 2009/0070125 A1* | 3/2009 | Geva | | 705/1 |
| 2009/0094109 A1* | 4/2009 | Aaronson et al. | | 705/14 |
| 2010/0049538 A1* | 2/2010 | Frazer et al. | | 705/1 |

OTHER PUBLICATIONS

Thani Jambulingam, John R. Nevin, Influence of franchisee selection criteria on outcomes desired by the franchisor, Journal of Business Venturing, vol. 14, Issue 4, Jul. 1999, pp. 363-395.*
John E. Clarkin , Steven M. Swavely "The importance of personal characteristics in franchisee selection" Journal of Retailing and Consumer Services, vol. 13, Issue 2, Mar. 2006, pp. 133-142.*

(Continued)

*Primary Examiner* — Gurkanwaljit Singh
(74) *Attorney, Agent, or Firm* — Sprinkle IP Law Group (57) ABSTRACT

In embodiments disclosed herein, a computer may operate to determine, for each member in a set and each non-member under consideration for the set, an expected revenue to be passed to a parent organization. The expected revenue may be determined utilizing a plurality of weighted features. Members in the set may be ranked according to their expected revenues. Top performing members in the set may be protected to ensure their expected revenues. Bottom performing members may be removed from the set and/or replaced with new members outside of geographical protective areas of the top performing members. The optimization process can be repeated until the set of members can satisfy an existing demand while maximizing revenue for the parent organization.

20 Claims, 5 Drawing Sheets

(56) References Cited

OTHER PUBLICATIONS

Rajiv P. Dant, Nada I. Nasr "Control techniques and upward flow of information in franchising in distant markets: conceptualization and preliminary evidence" Journal of Business Venturing, vol. 13, Issue 1, Jan. 1998, pp. 3-28.*

William E. Gillis, James G. Combs "Franchisor strategy and firm performance: Making the most of strategic resource investments" Business Horizons, vol. 52, Issue 6, Nov.-Dec. 2009, pp. 553-561.*

Ruiliang Yan, Kai-Yu Wang, Franchisor-franchisee supply chain cooperation: Sharing of demand forecast information in high-tech industries, Industrial Marketing Management, vol. 41, Issue 7, Oct. 2012, pp. 1164-1173.*

James G. Combs, David J. Ketchen Jr., Vera L. Hoover, A strategic groups approach to the franchising-performance relationship, Journal of Business Venturing, vol. 19, Issue 6, Nov. 2004, pp. 877-897.*

* cited by examiner

FIG. 6

SYSTEM, METHOD AND COMPUTER PROGRAM PRODUCT FOR DEMAND-WEIGHTED SELECTION OF SALES OUTLETS

TECHNICAL FIELD

This disclosure relates generally to selecting members for inclusion in and/or exclusion from a set in order to achieve a desired outcome. More particularly, embodiments disclosed herein relate to systems, methods and computer program products for determining what potential members, if any, should be included in and/or excluded from acquisition in order to maximize revenue of a parent organization.

BACKGROUND

One way for a business entity or organization to grow is by buying and selling other entities. For example, a parent organization may open a chain of stores and direct consumers to those stores. By doing so, the parent organization may gain a share of the profit from each sale made by the stores.

A franchise can be seen as a form of chain store. Wal-Mart is an example of a chain store, while McDonald's is an example of a franchise. In a franchise or franchised dealership, each party to the franchise (a franchisor and a franchisee) has certain obligations and share revenue from sales. Such a franchise usually lasts for a fixed amount of time and serves a specific territory or area surrounding its location. The franchisor is most involved in securing protection for their trademark, controlling the business concept and securing their know-how, but not necessarily the locations of their franchised outlets (establishments owned by franchisees). A buyer of a franchise (i.e., a potential franchisee) generally would have some say when determining the location of her franchise, although she may choose to work with the franchisor to determine a location for her franchise in a crowded market.

From the perspective of the franchisor (a parent organization), there can be many considerations in choosing a potential franchisee. The selection process is usually a complex and complicated one. Consequently, there is always room for improvement.

SUMMARY

Example embodiments provide a new way for a parent organization to intelligently select members that may be included in and/or excluded from a set in order to achieve a desired outcome such as maximizing total revenue that the parent organization can receive from members in the set. Non-limiting examples of members may include various types of entities such as sales outlets, retailers, dealers, stores, companies, and the like.

In embodiments disclosed herein, a computer may operate to determine, for each sales outlet (a member in a set or a non-member under consideration for the set), an expected revenue to be passed from the sales outlet to a parent organization. The expected revenue may be determined utilizing a plurality of features. There can be a variety of features. For example, features describing an individual sales outlet (a member or a non-member), features describing an individual sales outlet as compared to other sales outlets, features describing an individual customer, and features describing interactions of a particular customer and a particular sales outlet. Each of these features may have a weight associated therewith. One example of a feature may be a driving distance between a customer and a sales outlet, which can be weighted with respect to a geographic unit of the customer.

The expected revenue for a member in the set can be determined based on a demand for an item in a geographic unit, a probability of sale by the member for the item in the geographic unit, an inventory of the item at the member, and a per-unit revenue passed on from the member to the parent organization when a sale is made. One example of an item can be a trim of a vehicle that a customer has inquired at a website owned and operated by the parent organization.

The expected revenue for each non-member under consideration for the set can be determined in a similar manner. Values for unknown features used in determining the probability of sale by the non-member and the inventory of the item at the non-member can be imputed using average values for members having characteristics similar to the non-member. Examples of the characteristics may include geographic information and demographic information. Examples may include urbanicity and density of outlets.

Members in the set may be ranked according to their expected revenues. Top performing members in the set may be protected to ensure their expected revenues. One way to protect the top performing members may be to specify a physical or geographical protective area from which non-members are excluded from consideration for the set.

The top performing members may include all members that are not bottom performing members. Bottom performing members may be those having an expected revenue meeting or less than a predetermined value or percentage. One example of a predetermined value is zero.

Bottom performing members may be removed from the set and/or replaced with new members. New members may be identified by determining a net impact on revenue for each non-member outside of geographical protective areas of the top performing members. The non-member that yields the highest value of the net impact on revenue can be added to an optimal list for the set. The optimization process can be iterated until the set of members can satisfy an existing demand while maximizing revenue for the parent organization.

Embodiments disclosed herein can provide many advantages. As mentioned above, selecting members for inclusion in and/or exclusion from a set can be complex, subjective, and difficult, often involving manual processes. Embodiments of an automated and objective member selection methodology can address these issues and provide ways for a parent organization to intelligently select retail outlets for inclusion in and/or exclusion from a common financial arrangement such as a franchise, a chain store, a network, a lead generator, and the like, in order to achieve a desired goal or outcome. For example, the methodology can be easily applied by a parent organization seeking new stores to add to its 'chain', to extend a franchise opportunity, or to acquire dealers into a network across which leads are shared.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

As used herein, the terms outlets, retail outlets, sales outlets, retailers, dealers, franchises, chain stores, networks, lead generators, or any variation thereof, are non-limiting terms for entities that share a financial relationship with a common entity (a parent organization). Additionally, the terms parent organization, parent entity, sales directing entity or any variation, thereof are non-limiting terms regarding a central entity.

With the increasing popularity of customer online searches for candidate sales outlets before making on-site purchases, there is an increasing opportunity for an entity to yield residual financial benefits by directing customers toward sales outlets, which may be geographically dispersed. Generally, there are several ways a parent organization can obtain an interest in sales outlets:

a) through ownership of outlets in a "chain store" arrangement;

b) through franchising of outlets under a common branded identity;

c) through a lead-generation arrangement where the parent organization yields a financial benefit by directing customers toward outlets; and/or d) through a network of outlets that share common resources or affiliations.

By directing customers toward its outlets, a parent organization can gain monetary reward resulting from each sale made by each outlet. In order to maximize revenue, the parent organization may consider the following factors in selecting sales outlets:

Selection of outlets with little or no demand or poor performance will yield little or no revenue.

Selection of too many outlets with overlapping demand will not increase net revenue, but rather spread the net revenue over a larger number of outlets and incur unnecessary overhead (if the same revenue could be realized by managing a smaller set of outlets).

Highly performing outlets may be assigned special protections which give them exclusive access to a certain subset of customers, thereby strengthening the relationship.

If demand outstrips the capacity of existing outlets, additional outlets might be added.

As these issues are often complex, interdependent, subjective, and difficult to manage, there is a need for an automated and objective methodology for identifying ideal outlets for inclusion in or exclusion from membership. For purposes of discussion, a collection of outlets associated with a parent organization can be referred to as a set, with each outlet belonging to the set as a member and each outlet not belonging to the set as a non-member.

One example of a parent organization may be an owner of a web site. The owner may have a "lead-generation" arrangement with each dealership in a network of dealers (members). Members are able to use the web site owner's brand and leverage their expertise, tools, and information. Dealerships not belonging to the network (a "set") are non-members. Demand for products/services provided by the dealerships may be measured through visits to the parent organization's web site. Periodically, the network is re-optimized given the measured demand, distance between the demand and dealerships, performance of member/dealerships, evaluation of the current constraints facing each dealership, and the relative pricing of all outlets. During this re-optimization process based on a revenue-maximizing objective, underperforming members can be marked for removal from the set, strongly performing members may be given protection from new competition, and non-member dealerships can be selected for recruitment into the network. This optimization process can be implemented in various ways, depending upon the needs and desires of a particular parent organization.

For example, a goal of a parent organization might be to acquire members so that the net revenue of the set is maximized. To achieve this goal, the following factors may be considered:
1. The demand for the products/services at issue.
2. The per-unit revenue given to the parent organization for the sale of good/services.
3. The ability of potential customers to physically access the outlet offering the good or service.
4. The constraints on a member's ability to sell the item due to inventory or space constraints.
5. The price of the good/service relative to other outlets (members and non-members).
6. The expected performance of a member should it be added to the set.
7. The risk of over-saturating the set by adding too many members and that do not increase overall revenue, but simply distribute smaller shares of sales over a larger number of members.

Embodiments disclosed herein can provide a data-driven methodology for measuring each of these considerations and assembling them into a single metric to be assigned to each sales outlet. Once the metric is assigned to each outlet, the optimal (with respect to revenue maximization) set can be defined, thereby allowing identification of a) non-members that should be selected from recruitment into the set and b) set members that should be dropped and/or replaced by a non-member. Non-limiting examples will now be further described below.

Figure 1:
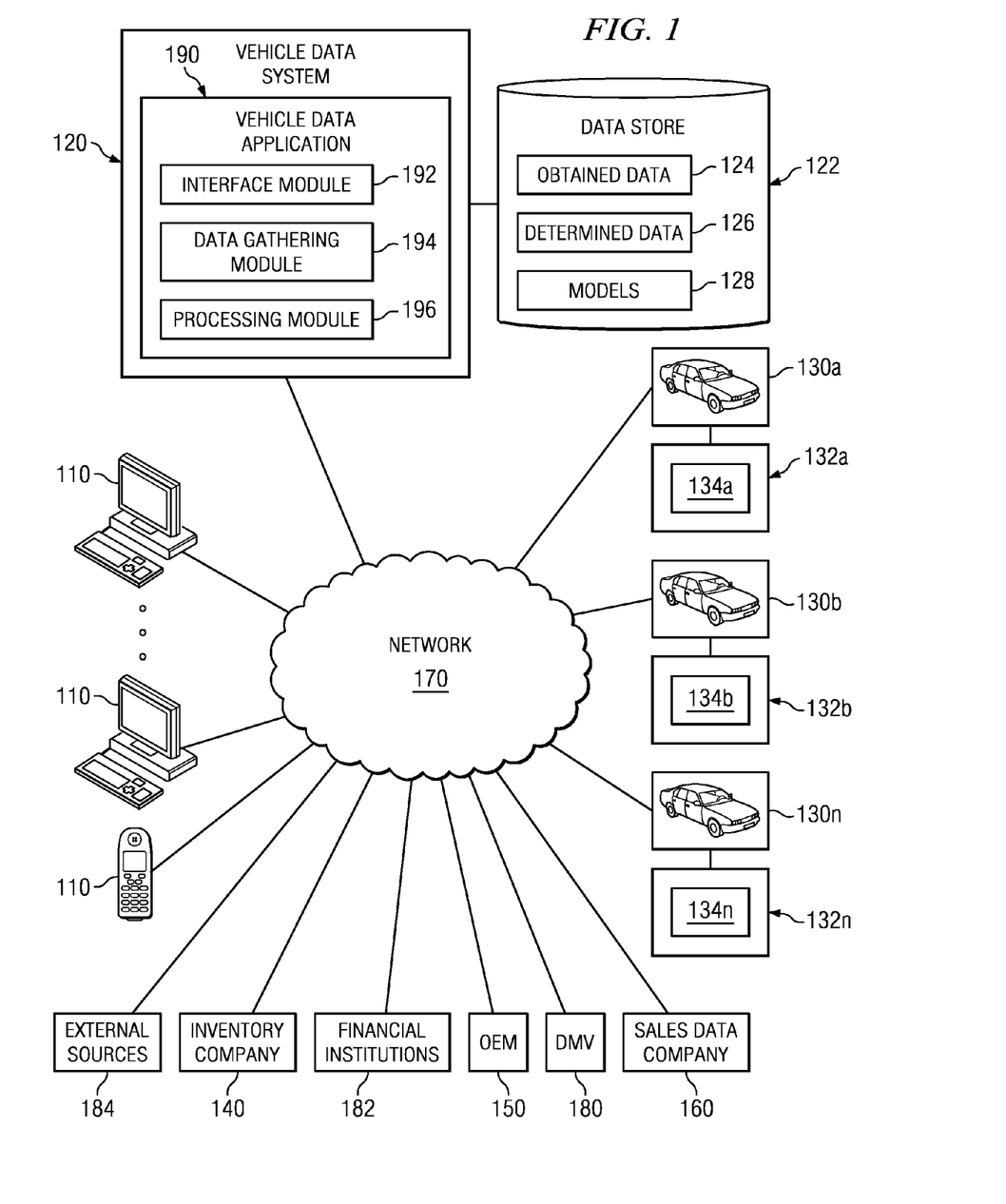
FIG. 1 depicts a diagrammatic representation of an example embodiment of a system for determining sales outlets for a parent organization.

FIG. 1 depicts one embodiment of a topology which may be used to implement embodiments of the systems and methods disclosed herein. Topology 100 comprises a set of entities including vehicle data system 120 (also referred to herein as the TrueCar system) which is coupled through network 170 to computing devices 110 (e.g., computer systems, personal data assistants, kiosks, dedicated terminals, mobile telephones, smart phones, etc.), and one or more computing devices at inventory companies 140, original equipment manufacturers (OEM) 150, sales data companies 160, financial institutions 182, external information sources 184, departments of motor vehicles (DMV) 180 and one or more associated point of sale locations, in this embodiment, car dealers 130. Computing devices 110 may be used by consumers while conducting a search for consumer goods and/or services, such as automobiles. Network 170 may be for example, a wireless or wired communication network such as the Internet or wide area network (WAN), publicly switched telephone network (PTSN) or any other type of electronic or non-electronic communication link such as mail, courier services or the like.

Vehicle data system 120 may comprise one or more computer systems with central processing units executing instructions embodied on one or more computer readable media where the instructions are configured to perform at least some of the functionality associated with embodiments disclosed herein. These applications may include a vehicle data application 190 comprising one or more applications (instructions embodied on one or more non-transitory computer readable media) configured to implement an interface module 192, data gathering module 194 and processing module 196 utilized by the vehicle data system 120. Furthermore, vehicle data system 120 may include data store 122 operable to store obtained data 124, data 126 determined during operation, models 128 which may comprise a set of dealer cost model or price ratio models, or any other type of data associated with embodiments disclosed herein or determined during the implementation of those embodiments.

Vehicle data system 120 may provide a wide degree of functionality, including utilizing one or more interfaces 192 configured to, for example, receive and respond to queries from users at computing devices 110; interface with inventory companies 140, manufacturers 150, sales data companies 160, financial institutions 182, DMVs 180 or dealers 130 to obtain data; or provide data obtained, or determined, by vehicle data system 120 to any of inventory companies 140, manufacturers 150, sales data companies 160, financial institutions 182, DMVs 180, external data sources 184 or dealers 130. It will be understood that the particular interface 192 utilized in a given context may depend on the functionality being implemented by vehicle data system 120, the type of network 170 utilized to communicate with any particular entity, the type of data to be obtained or presented, the time interval at which data is obtained from the entities, the types of systems utilized at the various entities, etc. Thus, these interfaces may include, for example, web pages, web services, a data entry or database application to which data can be entered or otherwise accessed by an operator, or almost any other type of interface which it is desired to utilize in a particular context.

In general, then, using these interfaces 192 vehicle data system 120 may obtain data from a variety of sources, including one or more of inventory companies 140, manufacturers 150, sales data companies 160, financial institutions 182, DMVs 180, external data sources 184 or dealers 130 and store such data in data store 122. This data may be then grouped, analyzed or otherwise processed by vehicle data system 120 to determine desired data 126 or models 128 which are also stored in data store 122.

A user at computing device 110 may access the vehicle data system 120 through the provided interfaces 192 and specify certain parameters, such as a desired vehicle configuration or incentive data the user wishes to apply, if any. The vehicle data system 120 can select a particular set of data in the data store 122 based on the user specified parameters, process the set of data using processing module 196 and models 128, generate interfaces using interface module 192 using the selected data set on the computing devices 110 and data determined from the processing, and present these interfaces to the user at the user's computing device 110. Interfaces 192 may visually present the selected data set to the user in a highly intuitive and useful manner.

A visual interface may present at least a portion of the selected data set as a price curve, bar chart, histogram, etc. that reflects quantifiable prices or price ranges (e.g., "average," "good," "great," "overpriced," etc.) relative to reference pricing data points (e.g., invoice price, MSRP, dealer cost, market average, internet average, etc.). Using these types of visual presentations may enable a user to better understand the pricing data related to a specific vehicle configuration. Additionally, by presenting data corresponding to different vehicle configurations in a substantially identical manner, a user can easily make comparisons between pricing data associated with different vehicle configurations. To further aid the understanding for a user of the presented data, the interface may also present data related to incentives which were utilized to determine the presented data or how such incentives were applied to determine presented data.

Turning to the various other entities in topology 100, dealer 130 may be a retail outlet for consumer goods and/or services, such as vehicles manufactured by one or more of OEMs 150.

To track or otherwise manage sales, finance, parts, service, inventory and back office administration needs dealers 130 may employ a dealer management system (DMS) 132. Since many DMS 132 are Active Server Pages (ASP) based, transaction data 134 may be obtained directly from the DMS 132 with a "key" (for example, an ID and Password with set permissions within the DMS system 132) that enables data to be retrieved from the DMS system 132. Many dealers 130 may also have one or more web sites which may be accessed over network 170, where pricing data pertinent to the dealer 130 may be presented on those web sites, including any pre-determined, or upfront, pricing. This price is typically the "no haggle" price (i.e., price with no negotiation) and may be deemed a "fair" price by vehicle data system 120.

Inventory companies 140 may be one or more inventory polling companies, inventory management companies or listing aggregators which may obtain and store inventory data from one or more of dealers 130 (for example, obtaining such data from DMS 132). Inventory polling companies are typically commissioned by the dealer to pull data from a DMS 132 and format the data for use on websites and by other systems. Inventory management companies manually upload inventory information (photos, description, specifications) on behalf of the dealer. Listing aggregators get their data by "scraping" or "spidering" websites that display inventory content and receiving direct feeds from listing websites (for example, AutoTrader.com, FordVehicles.com, etc.).

DMVs 180 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes.

Financial institution 182 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 160 may include any entities that collect any type of vehicle sales data. For example, syndicated sales data companies aggregate new and used sales transaction data from DMS 132 systems of particular dealers 130. These companies may have formal agreements with dealers 130 that enable them to retrieve data from dealer 130 in order to syndicate the collected data for the purposes of internal analysis or external purchase of the data by other data companies, dealers, and OEMs.

Manufacturers 150 can be those entities which actually build the vehicles sold by dealers 130. To guide the pricing of their vehicles, manufacturers 150 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 184 may comprise any number of other various source, online or otherwise, which may provide other types of desired data, for example data regarding vehicles, pricing, demographics, economic conditions, markets, locale(s), consumers, etc.

It should be noted here that not all of the various entities depicted in topology 100 are necessary, or even desired, in embodiments disclosed herein, and that certain of the functionality described with respect to the entities depicted in topology 100 may be combined into a single entity or eliminated altogether. Additionally, in some embodiments other data sources not shown in topology 100 may be utilized. Topology 100 is therefore exemplary only and should in no way be taken as imposing any limitations on embodiments disclosed herein.

Figure 2:
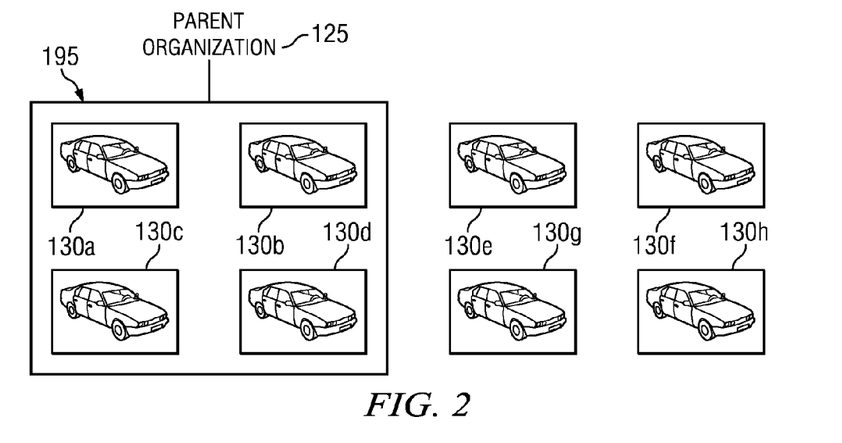
FIG. 2 depicts a diagrammatic representation of an example embodiment having a set of members being associated with the parent organization and non-members being unassociated with the parent organization.

FIG. 2 shows an example parent organization 125 and geographically dispersed sales outlets or dealers 130*a-h*. Parent organization 125 may have sales agreements with dealers 130*a-d*. Thus, dealers 130*a-d* may be members of set 195. Since dealers 130*e-h* are not in a financial relationship with parent organization 125, they are referred to as non-members. An example embodiment of a method for determining and optimizing membership of a set will now be described with reference to FIG. 3.

In example embodiments, revenue maximization can be a goal when considering what members should be included in and/or excluded from a set. Those skilled in the art can appreciate that numerous factors and/or criteria may be considered in order to maximize or increase the net revenue or profit for a parent organization. Some of the factors may include, but are not limited to, the recent or current demand for the goods, member performance, evaluation of the current constraints facing each member, and the relative pricing of among members. Embodiments disclosed herein include weighted factors that are integrated into a performance metric assigned to each member. To this end, it can be useful to first define the concept of expected revenue and then further explore each of its components.

Before a non-member sales outlet can be considered for membership in the set, the actual amount of revenue it is expected to yield the parent agency/organization has not yet been observed and must be estimated. The expected revenue that a non-member i will yield should it be granted membership in the set is a function of:

$d_{t,z}$: The demand for goods/services offered by the outlet to geographic unit z.

$P_{i,t,z}$: The expected probability that a customer will purchase item t if it is displayed to them during an online search.

$\omega_{i,t}$: The inventory of item t at outlet i.

$\pi_{i,t}$: The per-unit revenue passed on the parent entity when the sale is made.

The expected revenue for outlet i, $ER_i$, is then:

$$ER_i = \left[\sum_{t=1}^{T} \pi_{i,t} \times \min\left(\omega_{i,t}, \sum_{z=1}^{Z} P_{i,t,z} d_{t,z}\right)\right].$$

Note that, in one embodiment, the total sales of item t is constrained by the available inventory at outlet i. In one embodiment, the geographic unit may be a ZIP Code, city, county, state, or any other spatial entity for which the online search was restricted.

The probability of closing a sale can be decomposed into two parts: the probability of a sale to a customer and the probability of a purchase from an outlet. From a customer's perspective, the probability of vendor i selling product t given they were presented in a set of other outlets, S, is computed based on a logistic regression equation of the form:

$$P_s = P_{i,t,S} = \frac{1}{1+e^{-\theta_{i,t,S}}}$$

where
$\theta_{i,t,S} = \beta_o + \beta_1 X_{i,t,1} + \beta_2 X_{i,t,2} + \ldots + \beta_m X_{i,t,m} + \beta_q X_{i,t,S,q} + \beta_{q+1} X_{i,t,S,q+1} + \ldots + \beta_r X_{i,y,S,r} + \epsilon_{i,t,S}$, with each $X_{i,t,k}$ (k=1, ..., m) reflecting a feature of outlet i with respect to product t, each $X_{i,t,S,q}$ (q=m+1, ..., r) reflecting a feature of outlet i with respect to product t and the other outlet presented along with outlet i in set S, and each $\beta_n$ (n=0, ..., r) representing a coefficient for a component thereof.

On the other hand, from outlet i's perspective, the probability of customer c making a purchase on product t from the outlet be computed by the logistic regression equation of:

$$P_b = P_{i,t,c} = \frac{1}{1+e^{-\delta_{c,t,i}}}$$

where
$\delta_{c,t,i} = \alpha_o + \alpha_1 Y_{c,t,1} + \alpha_2 Y_{c,t,2} + \ldots + \alpha_n Y_{c,t,n} + \alpha_q Y_{c,i,q} + \alpha_{q+1} Y_{c,i,q+1} + \ldots + \alpha_r Y_{c,i,r} + \epsilon_{c,t,U}$, with each $Y_{c,t,k}$ (k'=1, ..., n) reflecting a feature of customer c interested in product t, each $Y_{c,i,q}$ (q'=n+1, ..., r') reflecting a feature of customer c's historical buying behavior from outlet i, and each $\alpha_n$ (n=0, ..., r) representing a coefficient for a component thereof.

Rather than considering each component separately and because the bilateral decision process implies interaction between the buyer and seller, a single value can be computed that considers the match of customer and vendors based on the following logistic function:

$$P_{i,t,z} = f(P_s, P_b) = \frac{1}{1+e^{-(\theta_{i,t,S}+\delta_{c,t,i})}}$$

Logistic regression is a statistic method used for prediction of the probability of occurrence of an event by fitting data to a logit function. It is an empirically-base statistical method for modeling binomial outcome (e.g., sale vs. no sale). In example embodiments, independent variables reflecting 1) individual outlet features, 2) individual outlet features relative to other outlets, 3) individual customer features and 4) customer's historical preference can be potential factors based on empirical knowledge on their relationship with closing a sale. Data transformation may be needed for variables with large variance or skewed distribution. Missing values should be imputed based on appropriate estimates such as using local average of historical data. Forward, backward and stepwise model selection procedures are used to select independent variables. Rescaled or additional derived variables can be defined in order to reduce the variance of certain variables and increase the robustness of coefficient estimates. The final model coefficients can be chosen such that the resulting estimate probability of sale is most consistent with the actual observed sales actions given the vendors displayed historically.

Cross-validation can be performed to test the consistence of the model estimates. The final dataset can be randomly split into two groups for refitting the model. This tests whether the model estimates are robust among different sampling groups. Due to changes in market environment, customer behaviors, dealer features overtime, the final model may be subject to other type of cross validation if the final model data source is collected in a long time interval. As an example, the final dataset can be split to half by time. The final model can then be refitting to the both "before" and "after" sample to test the consistent of coefficients over time.

Figure 3:
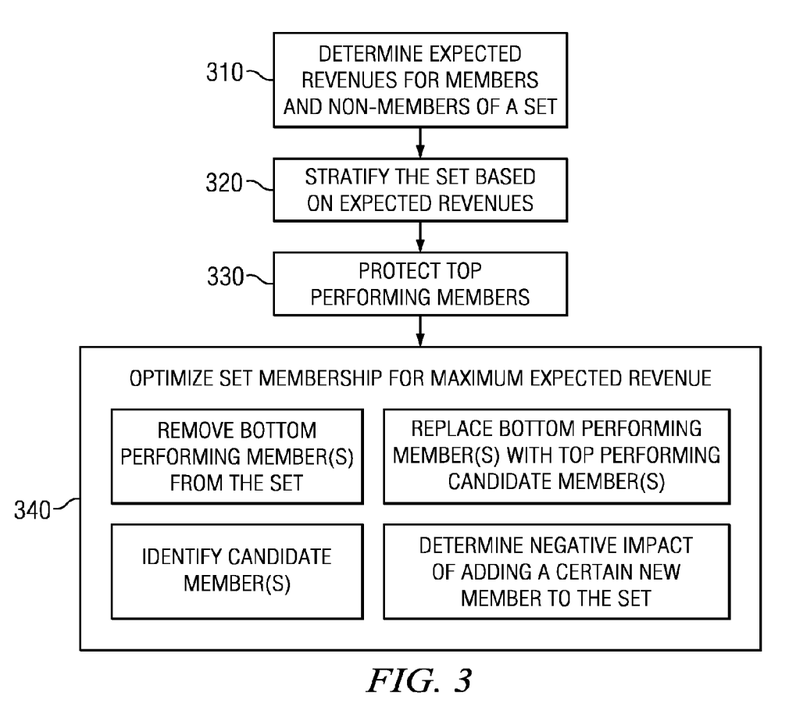
FIG. 3 depicts a flow diagram representing an example embodiment of a method for determining and optimizing membership of a set.

Periodically, membership of a set can be re-optimized or otherwise reconfigured. In some embodiments, a computer system of a parent organization may utilize various types of data to determine (via an embodiment of a computer program having at least one non-transitory computer readable medium storing instructions executable by the computer system to implement an embodiment of the methodology disclosed herein) an expected revenue for each member in a set (Step 310). The various types of data can be obtained from one or more data sources such as those described above with reference to FIG. 1 (e.g., inventory companies 140, manufacturers 150, sales data companies 160, financial institutions 182, DMVs 180, external data sources 184, dealers 130, etc. coupled to vehicle data system 120). The obtained data can be persisted in a data store accessible by the parent organization. For example, when a user logs onto computing device 110 and searches for a specific consumer good and/or services, external data source 184 may monitor the search and store relevant information into data store 122 of parent organization 125. Also, data may be retained based on a history of a consumer buying certain goods from certain dealers 130, or financial institution banking records from financial institutions 182. In even further example embodiments, a website of the parent organization may log the activity of searches for specific models of cars, the zip code where the search was originated, and the date and time of the search on the computing device 110.

The computer system may operate to determine the expected revenue for each member in the set as follows:

Measure the demand for item t in geographic unit z, $d_{t,z}$, for every geographic unit, z=1, ..., Z.

Determine outlet i's inventory of item t, $\omega_{i,t}$.

Estimate probability of sale, $P_{i,t,z}$ for every item t, geographic unit z, and member l, using the logistic regression equation provided above.

Calculate the expected revenue for member i, $ER_i$, based on the collected/estimated data and the known per-unit revenue given to the parent for each item, $\pi_{i,t}$.

The computer system may further operate to determine the expected revenue for each non-member in consideration for the set as follows:

Measure the demand for item t in geographic unit z, $d_{t,z}$, for every geographic unit, z=1, ..., Z.

Impute values of unknown features used in the computation of outlet i's inventory of item t, $\omega_{i,t}$, and the probability of sale, $P_{i,t,z}$, using the average values for member outlets located in areas with similar demographic information (e.g., urbanicity, density of outlets).

Estimate the expected revenue for non-member i, $ER_i$, based on the collected/estimated data and the per-unit revenue expected to be charged to a new outlet, $\pi_{i,t}$.

As discussed above, a geographic unit may refer to a particular geographical boundary. An example geographical boundary may be a zip code, city, county, state or any other area.

After the excepted revenues are computed for each member, the computer system may further operate to rank the members in the set (Step 320). For example, the members can be ranked in decreasing order, with the top T % being labeled as lop performers', the bottom B % being labeled as 'bottom performers', and the remaining (100-B-T) % being considered 'average performers'. The values of B and T are variables that can be determined by the parent organization.

To protect the revenue of members who are performing better than the bottom performers, protections may be put in place (Step 330). One way to protect top performing members may be to exclude each potential (candidate) member c from membership consideration if they are a) within a certain miles $r_t$ of a 'top performer' or a certain miles $r_a$ of 'average performer' and b) the addition of candidate member c within $r_t$ and $r_a$ mile limits will result in a reduction in the net revenue of the protected member. If the existing protected member's inventory is insufficient to service existing demand, then the addition of nearby outlet to the set may not have an impact of revenue as it is serving unmet demand (see an example negative impact analysis described below with reference to Step 340). If the protective measure for a top performing member is put in place, this would mean that non-members within the protective area would not be eligible for membership in an effort to protect the top performing member.

One example of a protective area may be a 30-mile radius protective "moat" around a top performing dealer 130 from set 195. Non-members that are in and/or close to this protective area may be identified and/or marked so that they will not be added or considered to be added to set 195. Dealers 130 that are bottom performers and that are in and/or close to the protective area may be considered for removal from set 195. Those skilled in the art will appreciate that a protective area may have any desired shape and/or size. The protective areas will be discussed in more detail below with reference to FIG. 4.

Removing bottom performing member(s) is one of many ways to optimize the set (Step 340). The removal of a bottom performing member or members can depend on a predetermined performance threshold and/or the ranking. For example, the computer system may implement a policy in which any set member for which $ER_i=0$ is to be removed from the set. As another example, the computer system may implement a policy in which any set member for which the corresponding ER is in the bottom 5% is to be removed from the set.

Adding one or more new members to the set is another way to optimize the set. As an example, for each non-member not within a protective area of a member, a net impact on revenue of adding that non-member to the set can be evaluated as follows:

$$ER^{(c)} = ER_c + \Sigma_i ER_{i|c}$$

Here, $ER^{(c)}$ represents the expected revenue of a candidate member c (a non-member), assuming that the candidate member c will enter the set, and $ER_{i|c}$ is the expected revenue for existing network members, assuming that the candidate member c is added to the set. If $ER^{(c)} > \Sigma_i ER_i$, then the candidate member c is considered for addition to the set. Across all c=1, . . . , C candidate non-members, the one yielding the highest value of $ER^{(c)}$ is added. After the new outlet is added, this process is repeated until addition of new outlets ceases to increase revenue (i.e., the set satisfies existing demand while maximizing revenue for the parent organization).

Additionally or alternatively, bottom performers within a set may be replaced by non-members. As explained below, doing so may increase the expected revenue for a parent organization. The impact of replacing outlet j with outlet c (c≠i) can be evaluated as follows:

$$\Delta ER(c,-j) = (ER_c + \Sigma_{i \neq j} ER_{i|c}) - \Sigma_i ER_i$$

If $\Delta ER(c,-j) > 0$ then the replacement is made.

In some cases, adding a member to a set may have some negative effects. For example, in an area with three existing outlets, adding an additional dealer may not contribute to an increase in total revenue even if the expected revenue of the added dealer is positive because that increase may come entirely from sales that would have otherwise gone to other dealers already in the network. In this example, the negative effects would be observed in the nearby dealers as well. By adjusting the features of each dealer to reflect the possibility of adding the prospective new dealer, some estimate of the negative effects to the current dealers may be obtained. For example, in calculating a probability of sale, variables for the count of dealers with various drive-time radii can be incremented to simulate a change in the probability of sale under a hypothetical scenario with the prospective dealer being added. The change in the probability of sale for the in-network dealers with one additional nearby dealer represents an estimate of the negative impact to those dealers of adding the additional dealer.

The negative impact to other nearby dealers can then be subtracted from the predicted positive impact to yield a net impact, which can be used to rank the dealers, and may result in a different ranking than a similar approach that does not consider the negative effect to nearby dealers of adding another dealer.

For example if an in-network dealer has probability of sale calculated by:

$$P_s = P_{i,t,S} = \frac{1}{1 + e^{-\theta_{i,t,S}}}$$

where
$\theta_{i,t,S} = \beta_o + \beta_1 X_{i,t,1} + \beta_2 X_{i,t,2} + \ldots + \beta_m X_{i,t,m} + \beta_q X_{i,t,S,q} + \beta_{q+1} X_{i,t,S,q+1} + \ldots + \beta_r X_{i,y,S,r} + \epsilon_{i,t,S}$ Consider the term $\beta_q X_{i,t,S,q}$. If $X_{i,t,S,q}$ represents the number of competing dealers within 30 miles of dealer i, and the coefficient $\beta_q < 0$ as would be expected. Then, in comparing the probabilities of sale between a dealer i and a hypothetically added dealer k, the probability of sale for dealer i for the case where dealer k has been added should be recomputed:

$X_{i,t,S,q}' = X_{i,t,S,q} + 1$ and $\beta_q X_{i,t,S,q}' < \beta_q X_{i,t,S,q}$ and $P_s' < P_s$ meaning $ER_i' < ER_i$ By adjusting the probability of sale in this way, the above-described model can account for some of the negative effects of adding a new dealer to the network. In order to correctly assign these negative effects to the dealer under consideration, the calculation would be $$ER_k' = ER_k - (ER_i - ER_i')$$

which correctly adjust the additional revenue resulting from adding dealer k for the negative impact such an addition would have on dealer i's revenue.

The above-described steps may be repeated as needed or desired. Further, the steps described above may be performed in different orders and/or in conjunction with other steps to maximize the expected revenue yield from members of a set to a parent organization.

Figure 4:
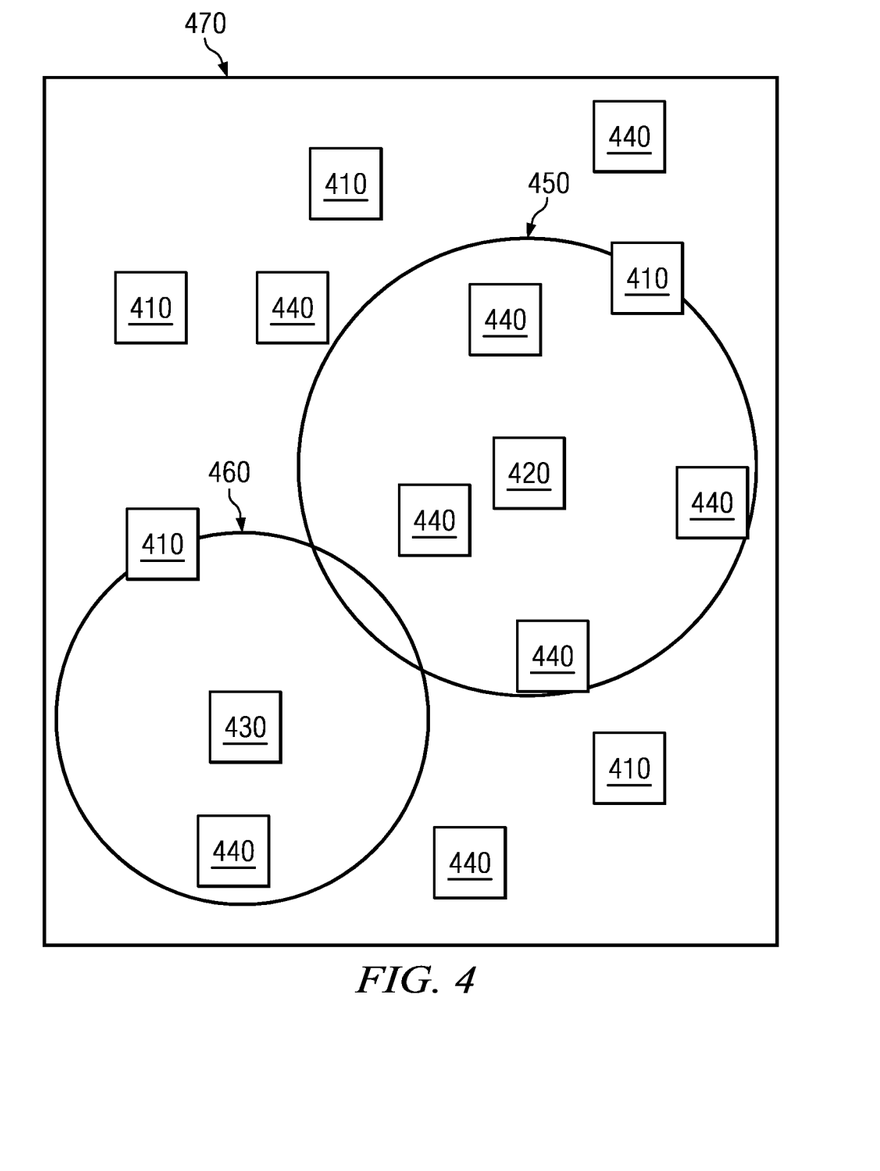
FIG. 4 depicts a diagrammatic representation of an example embodiment of protecting member(s) of a set.

FIG. 4 is an example embodiment representing a protective area for the top performing members within a set for a geographic unit 470. Geographic unit 470 may be defined by a zip code, county, state, a group of zip codes, counties, or states. Specifically, FIG. 4 shows members 410, 420, 430, and non-members 440. Members 420 and 430 may be identified as top performers in a set and thus have associated protective areas 450 and 460. Non-members 440 in either protective area may not be eligible for membership. The protective areas 450 or 460 may be of any shape and may be based on radial distance, driving distance, driving time, or a combination thereof. Other criteria are also possible. Furthermore, based on each member's ranking of the expected or actual revenue yield, a protective area may be configured and/or adjusted to any shape and/or size. For example, as shown in FIG. 4, top performing member 420 may have an expected revenue yield higher than that of top performing member 430. As such, protective area 450 for member 420 can be defined to be larger than protective area 460 for member 430.

Distance between a buyer and a seller may also be computed based on radial distance, driving distance, or driving time. The starting point in the distance calculation can be either the address of the potential customer, or point located at the center of the geographic unit (e.g., the center of a ZIP code) in which the customer is located. Physical distance between a buyer and a seller can be an important consideration and, all other things equal, it is reasonable to expect that an outlet closer to the buyer will have a larger probability of sale. Holding constant the other factors, the probability of sale, $P_{i,t,z}$, for various buyer-seller distanced is shaped by a regression coefficient, $\phi$. Thus, a dominant feature in the probability of sale can be the ability of customers (those generating demand from a particular geographic unit) to physically access the outlets offering the good or service.

Figure 5:
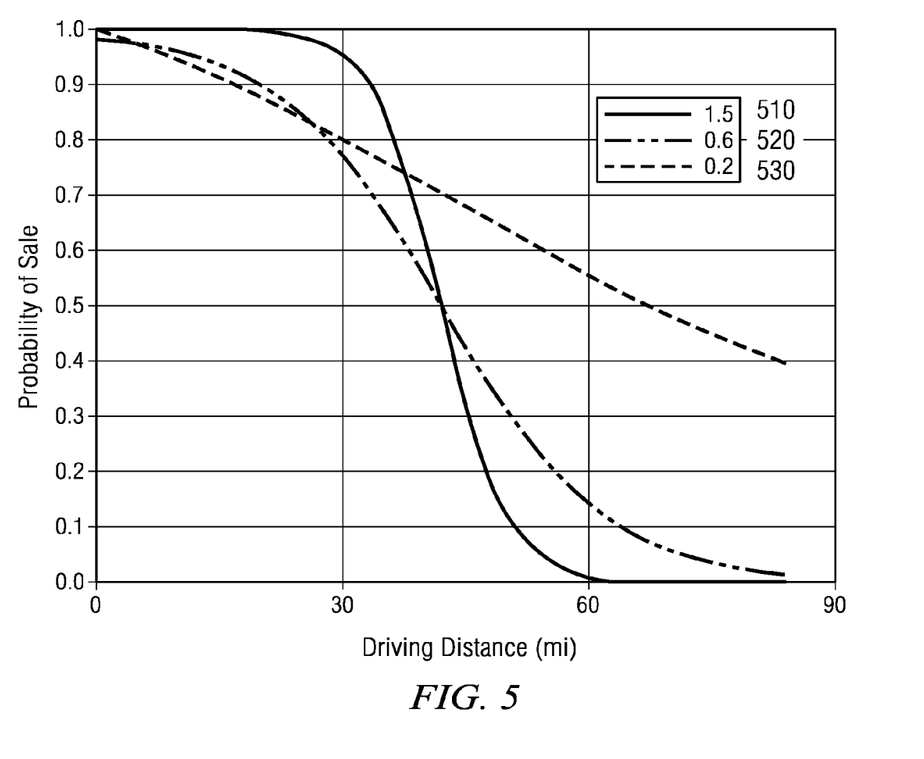
FIG. 5 depicts a plot diagram showing how driving distance can affect the probability of sale.

FIG. 5 is a plot diagram showing the relative effect on the probability of sale for various distances and coefficients (weights). The weights for the same variable representing a distance may vary from one geographic unit to another. For example, consumers in an urban environment may not desire to travel long distances to a dealer. Whereas, consumers in a rural environment may be willing to travel further distances to purchase desired goods. Accordingly, a first variable representing a distance between a buyer and a seller in the urban environment may be associated with a first weight that is higher than a second weight associated a variable representing the same distance between a buyer and a seller in the rural environment. As a specific example, in FIG. 5, curve 510 represents the driving distance effect on the probability of sale in a urban environment, curve 520 represents the driving distance effect on the probability of sale in a suburban environment, and curve 530 represents the driving distance effect on the probability of sale in a rural environment. As illustrated in FIG. 5, there can be a significant difference in the probability of sale between a 30-mile driving distance and a 60-mile driving distance in an urban environment. However, in a rural environment, the same change in driving distance has less of an effect on the probability of sale. In this example, the driving distance effect on the probability of sale in a suburban environment is somewhere in between the urban environment and the rural environment. As discussed above, the actual value of the coefficient (weight) can be determined empirically.

In addition to the distance between the buyer and seller, there are other spatial considerations that can impact the probability of sale (and hence, the expected revenue). For example, the density of members in a local area may have an effect on competition and possibly a spreading of sales across members in the area. Further, competition may exist from non-members, since customers technically have access to all outlets. Thus, it can be expected that little or no additional revenue may result by adding outlets to a local area where demand has been satisfied by the members of the set. In areas where demand has not been met by the members of the set, there is an opportunity to add members. However, adding a dealer to the network may have some negative effects. So as not to negatively impact the profitability of existing members, the probability of sale may be adjusted as described above to account for some of the negative effects of adding a new dealer to the network.

An example embodiment implementing a Targeted Franchise Dealer Acquisition (TFDA) model will now be described in detail below. Those skilled in the art will appreciate that there can be multiple, various modifications to the embodiment described below, all of which are anticipated and are within the scope of this disclosure.

TFDA Data Description

Demand data—The demand data can be gleaned from website activity logs that are maintained by a parent organization that owns the website (and other means) designed to direct potential customers (leads) to various sales outlets. The demand data may include the vehicle trim, t, for which a search is conducted from ZIP code z, as well as the time/date of visit.

Dealer Scoring Algorithm (DSA) data—The DSA log data indicates if a lead for trim t in ZIP code z generated through the website to any dealer, i, results in a sale. Cohorts with leads less than 15 days old are excluded since the leads take time to convert into sales. Those leads are excluded to prevent underestimate the close rate of dealers.

Drive distance data—Drive distance and drive time of search zip to dealer location are obtained, in one embodiment, from mapquest.com In the case of missing values, the drive distance and drive time value may be imputed based on the average drive distance and great circle distance ratio for similar an nearby ZIP codes.

Dealer inventory data—Dealers' new car inventory information can be obtained from data feeds provide by dealers themselves.

Features

In this example, four types of features are considered in the calculation of probability of closing a sale: Features describing the individual vendor ($X_{i,t}$), Features of individual vendor compared to other vendors ($X_{i,t,S}$), Features describing individual customer ($Y_{c,t}$), Features describing the historical interactions of a particular customer and a particular vendor ($Y_{c,i}$). These will be separately described below.

Features Describing the Individual Vendor ($X_{i,t}$)

Common factors including price, distance from the buyer, available inventory, services and perks, vendor reputation, historical sales performance and so on.

In terms of the TFDA model, distance can be an important factor influencing buyers' decisions for durable goods such as vehicles. Although great circle distance can be used, there are certain areas with islands and lakes (e.g., great lakes or Long Island, N.Y.) where drive distance can be a better indicator of the true travel distance than great circle distance. Drive time is also introduced into the model because the same drive distance in different locations might be associated with a different drive time. For example, 60 miles might require a 1 hour drive in a rural area but 2 hours or more in a big city. Therefore, drive time is preferred because it can be equalized to facilitate comparison across different locations.

Price can significantly affect sales in a competitive market. The price offset relative to the invoice price of the vehicle can be considered an important factor in the model. In order to reduce the price variance of different vehicles, the price offset as a percentage of invoice price is used in this example as the main price variable in the model. Similar to distance, an additional variable measures the absolute difference of price as a percentage of the worst price was constructed to adjust for the effect of price on probability of sale for those cases where the worst price and best price do not differ substantially. In this example, for those dealers who do not provide an upfront price, the maximum price allowed by the program (a dealer network) maximum value is used for their price offset.

Dealers have certain characteristics that may cause the user to prefer them over others. These factors include their car inventory, special services, their historical performance, and their locations. The model incorporates dealers' overall new car inventory as a factor in the model. Customer surveys indicate that vehicle unavailability can be a big cause of sale failure. Customers complain that they are not able to get the cars they want when they go to the dealers. Therefore, the new car inventory value is introduced as a variable to measure the overall dealership size. Here, it is assumed that a larger dealership is more likely to have the customer's preferred vehicle than a smaller dealership. Through various sources, the parent organization may have sufficient information (e.g., about 75% or more) of in-network dealers' new car inventory. For dealers with no inventory information (e.g., a non-member dealer in the candidates' dealer list), the model may assign the average value of inventory for each cohort.

Seven other drive distance or drive time derived variables are developed in order to capture the sale and distance relationship for certain special cases. It is possible that the drive time for the closest dealer and furthest dealer does not differ substantially. In those cases, the other 7 factors will adjust the weights on drive time so that there is no overestimate on the effect of minimum drive time on sale.

Besides the vehicle itself, car buyers often consider the warranty, maintenance and other services offered by a dealer during their decision process. The website may display dealers' special services along with their upfront price and location in search results. Therefore, if the dealer provides special services this is considered as a potential factor that might influence the probability of closing a sale. For example, a "perks" dummy variable can be defined as 1 if the dealer provides any one of the following service such as limited warranty, money back guarantee, free scheduled maintenance, quality inspection, delivery, free car wash, and 0 otherwise.

Probability of sale can be highly related with the historical performance of a dealer. Dealers with excellent sales people or good reputations should have higher close rates than others. Those factors are measured by their historical close rates. The model calculates the close rate for each dealer based on their performance in the preceding 45 day window. In one embodiment, a period of 45 days is chosen as the width of the window. This can provide a dealer's historical performance and also can quickly reflect the changes of the overall vehicle market due to factors such as gas price change or new model release and so on. The details of calculation of dealer close rate are explained below using equation (1). Since some dealers only take leads from those zips that are located within 60 miles, the close rate in this example is based on the sales and leads from within 60 miles of driving distance. When the close rate is missing due to no sale or no leads in the past 45 days, the average close rate for nearby dealers is used.

$$\text{Dealer close rate} = \frac{(\text{Count of sales in last 45 days})}{(\text{Count of sales in last 15 days} + \text{Count of leads in last 30 days})} \quad (1)$$

In order to better predict the inventory status of a dealership and put more weight on dealers' most recent performance, a variable known as "defending champing" is included in the model as another type of performance measuring variable. The defending champion assigns a higher weight to those dealers with more recent sales. For instance, dealers will get more credit for a successful sale yesterday than for a sale from 30 days ago. This also serves as a proxy for inventory in that the dealers who have recently made a sale for a make will have a higher chance of having similar cars in their inventory than dealers who have not made a sale for a while.

In addition, dealer location is also very important to sales when the customer is located on the border of two states. Due to the different rules on vehicle regulation and registration, people might tend to go to a dealer located in the same state as where they live. "Same State" dummy variable is therefore included in the model to indicate if the customer and dealer are located in the same state.

Features of Individual Vendor Compared to Other Vendors $(X_{i,t,s})$

The absolute value of an individual vendor's attributes do not reflect its advantage or competitiveness, but they do when compared relative to other vendors attributes. Therefore, vendor features relative to other competitors are important factors in predicting the probability of sale in the algorithm.

In the algorithm, most of the individual dealer features such as drive time, price offset, historical close rate, inventory and defending champing are all rescaled among all the candidate dealers with in each cohort. Individual dealer's historical dealer close rate, new car inventory are rescaled using the following equation:

$$x^i = \frac{(x_i - \min_i x)}{(\max_i x - \min_i x)}$$

Drive time, defending champion and price are rescaled using a different equation:

$$x^i = 1 - \frac{(x_i - \min_i x)}{(\max_i x - \min_i x)}$$

All the resealed variables will have values between 0 and 1. The variables are rescaled to obtain a value of 1 for the best dealers in each competitive cohort. For example, the dealer with the highest historical close rate will get a rescaled close rate of 1 and the dealer with lowest close rate will get a value of 0. Similarly, the dealer with the minimum drive time will get a value of 1 and the dealer with maximum drive time will get a value of 0. Coercing these values onto the same scale allows for comparison of dealers across competitive cohorts.

Features Describing Individual Customer $(Y_{c,t})$

The demographic features of individual customers predict different interests in products and the likelihood of buying from a particular vendor. These factors include income, family size, net worth, gender, their distance from the vendor, etc. These data can be obtained from public data sources such as the U.S. census or online user databases for different industries.

In the DSA algorithm, searched vehicle make and customer local dealer density are included in predicting the probability of buying for a particular cohort. Customers' choice of vehicle make can be a potential indicator of customer's income, family size. For example, people purchasing luxury cars may be less sensitive to price and more sensitive to drive time. If true, the DSA algorithm can put more weights on distance when the customer comes from a high income zip code to increase the probability of closing. It is also reasonable to assume that price is more important on sale for customer located in big cities with high dealer density while distance is more crucial for people in rural areas with only a few dealerships available within 200 miles. Count of available dealers within certain drive time radius are used as network density variables. Dummy variable for each make are included in the model selection process using SAS proc logistic, three out of 35 makes (Mercedes-Benz, Mazda, Volkswagen) have significant p-values for their dummy variables, which indicates that those three makes have different sales probability compare to other makes. Further, make and dealer density interaction terms are tested as well and the interaction between Mercedes-Benz and dealer density remain significant. So those factors are also included in the final model. Although the make and network features will not affect the dealer ranks within each cohort since each cohort will have the same make and density information for different candidate dealers, those factors will affect the expected revenue for each dealer and the parent's revenue that those three makes have different function of probability of sale compare to other makes.

In the car buying industry, certain dealers can have outstanding performance in certain zip code areas compare to their average performance across all the zip codes. This may be due to some customer population characteristics in certain zip codes. For example, a zip code with high density of immigrants whose first language is not English might go to a dealership with sales persons who can speak their first language or have a dealer website with their first language. Therefore, a variable measuring each dealer's performance in specific zip code is also included in the model.

Features Describing the Historical Interactions of a Particular Customer and a Particular Vendor ($Y_{c,i}$)

Besides the individual customers' features, their historical buying preferences will also influence their purchasing behavior. Those types of factors are frequency and volume of transactions, the price tier (low, medium high) in which their transactions fall, vendor's historical sales to that customer (a proxy for loyalty), etc.

In the car buying example, it is possible that customer might go to the same dealer if they bought car from this dealer before. The customer loyalty effect might even bigger in some other industries which provide services rather than actually products. This could be one of the most important factors for predicting the probability of buying for a particular customer from certain vendor.

Operationally, the model would simply use the estimated model by feeding in the values of the independent variables, computing the probabilities for each candidate dealer, and present the dealers with the top probabilities of closing to customer c. It considers all dealers, (i=1, ... K) selling the same trim (t=1, ..., T) to users in ZIP Code z (z=1, ..., $Z_L$) located in the same locality L (z∈L) if the great circle distance from the customer's search ZIP code center to dealer location ≤250 miles. The model uses a logistic regression based on the combined data of inventory, DSA logs, drive distance, and dealer perks:

$$P_c = f(P_s, P_b) = \frac{1}{1 + e^{-(\theta_{i,t,S} + \delta_{c,t,i})}} \text{ where}$$

$$\theta_{i,t,S} = \beta_0$$

{Features of individual dealers, i} +

$\beta_1 \times$ the make of trim $t$ is Mercedes-Benz +

$\beta_2 \times$ Mercedes-Benz make and density interaction +

$\beta_3 \times$ Mazda make and density interaction +

$\beta_4 \times$ Volkswagen make and density interaction +

$\beta_5 \times$ count of dealers within 30 min drive +

$\beta_6 \times$ count of dealers within 1 hour drive +

$\beta_7 \times$ count of dealers within 2 hours drive + $\beta_8 \times$ dealer's perks +

$\beta_9 \times$ dealer's rescaled price within each cohort +

$\beta_{10} \times$ dealer's historical close rate

{Features relative to other candidate dealers, i, S} +

$\beta_{11} \times$ if dealer has the minimum drive time +

$\beta_{12} \times$ if dealer has lowest price within each cohort +

$\beta_{13} \times$ difference between the dealer's price and maximum price offset in percentage of invoice $\delta_{c,t,i} = \alpha_0$ {Features of individual Customer, c} +

$\alpha_1 \times$ the household income of customer $c$ +

$\alpha_2 \times$ the family size of customer $c$ + $\alpha_3 \times$ customer $c$'s household size +

$\alpha_4 \times$ customer $c$'s local dealer density +

$\alpha_5 \times$ if customer bought this type, or this make before

{Features describing the interaction of customer c and dealer i} +

$\alpha_6 \times$ distance from customer $c$ to dealer $i$ +

$\alpha_7 \times$ if customer $c$ bought from dealer $i$ before +

$\alpha_8 \times$ dealer $i$'s rescaled number of scales in customer $c$'s ZIP code +

$\alpha_9 \times$ if dealer $i$ is within 10 miles of customer $c$ +

$\alpha_{10} \times$ if dealer $i$ is within 10-30 miles of customer $c$ +

$\alpha_{11} \times$ if dealer $i$ is within 30-60 miles of customer $c$ +

$\alpha_{12} \times$ if dealer $i$ is within 60-100 miles of customer $c$ +

$\alpha_{13} \times$ if dealer $i$ is within 100-250 miles of customer $c$ +

$\alpha_{14} \times$ if dealer $i$ is in the same state as customer $c$ +

$\alpha_{15} \times$ difference between the dealer's drive time and maximum drive time within each cohort +

$\alpha_{16} \times$ dealer's rescaled drive time within each cohort +

Figure 6:
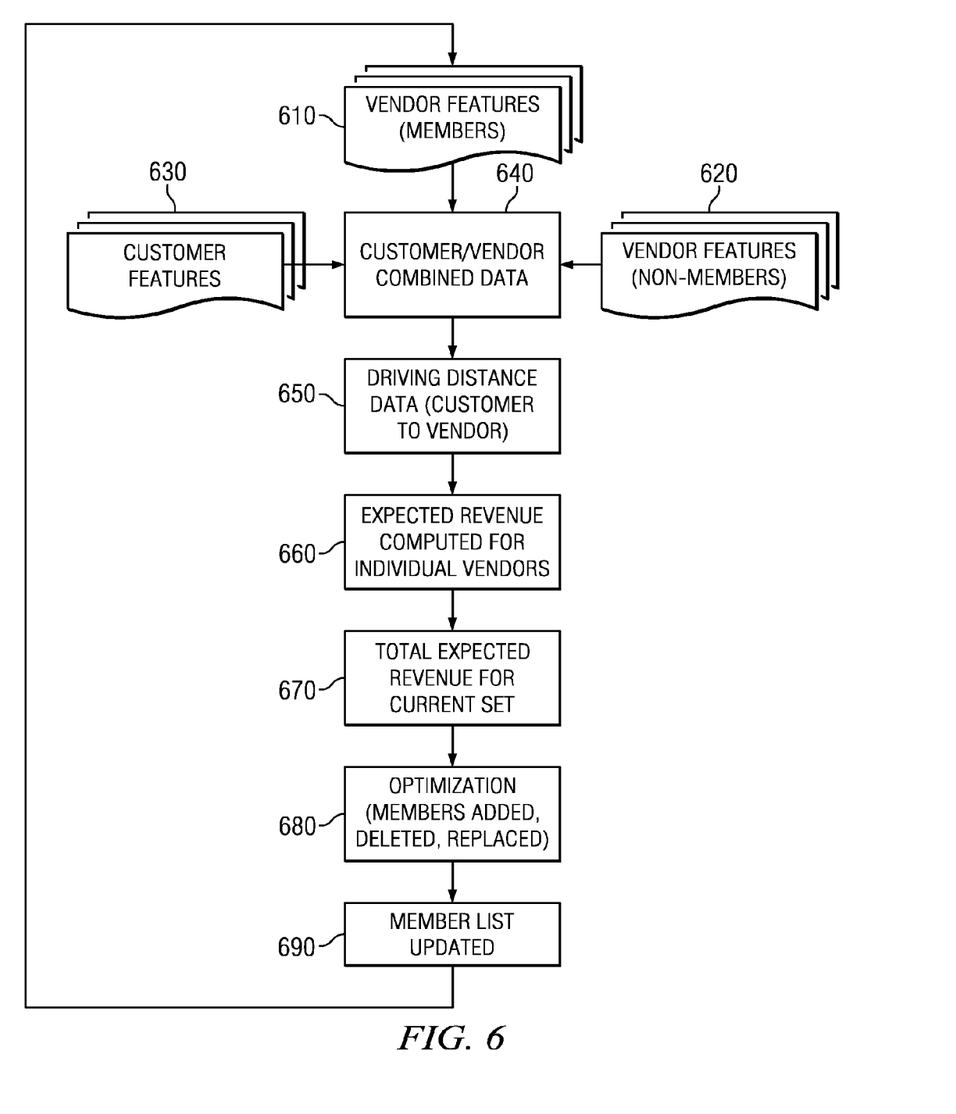
FIG. 6 depicts a flow diagram representing an embodiment of data flow in determining sales outlets for a parent organization.

$\alpha_{17} \times$ dealer's rescaled price and rescaled drive time interaction + $\varepsilon_{c,t,i}$ Although the dealer rank won't change if customer features and customer historical preference variables are excluded from the algorithm, they are included in the model because the overall probability of closing will be different for different makes. This probability can be applied to calculate the each dealer's expected revenue and that number can be affected by the choice of make and customer local dealer density. An example of the relationship between the various tables is shown in FIG. 6.

Stratifying the Set and Protecting Members

The expected revenue for each member and non-member dealer is computed using available data. For non-members where the input values are not known, the average values of members having similar characteristics (same make, Census region, dealer density, and similar urbanicity levels) are used. As a specific example, the in-network dealers associated with the top 10% of expected revenue are considered top performers and given a protective moat of 30 miles, the next 80% of expected revenue dealers are given a protective moat of 15 miles and the final 10% are considered 'bottom performers' and not given a moat at all.

Identifying New Dealers

Among non-network dealers not intruding on the moat of an active dealer, dealers are sorted based on expected revenue values. The sorted list is given to the parent organization's sales representatives who then attempt to recruit these non-members based on sort order. In one embodiment, there is no evaluation of replacement of potential dealers.

FIG. 6 depicts a flow diagram representing an embodiment of data flow in determining sales outlets for a parent organization. In this example, features particular to members (610), features particular to non-members (620), and features particular to potential customers (630) are communicated to or otherwise obtained by a computer system of a parent organization. The combined data 640 may be examined and utilized to determine driving distance data 650 which can be input to expected revenue model 660. Expected revenue model 660 may be run as described above to determine an expected revenue for each individual vendor and produce total expected revenue 670 for a current set.

Periodically, this current set may be optimized as described above (by adding one or more new members, deleting one or more existing members, and/or replacing one or more members in the set with one or more non-members) in order to maximize total expected revenue 670. In one embodiment, optimization module 680 may be configured to perform the member addition, deletion, replacement, or a combination thereof. Optimization module 680 may produce an updated member list 690 identifying a set of members that would yield the highest total expected revenue 670. As described above, efforts may be made to adjust membership in the current set accordingly. Feature data 610 for members in the set may then be updated correspondingly.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

Furthermore, the term "or" as used herein is generally intended to mean "and/or" unless otherwise indicated. As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed:

1. A method, comprising:
    determining, by a computer of a parent organization, an expected revenue that each member in a set is to pass to the parent organization;
    identifying, by the computer of the parent organization, top performing members in the set utilizing the expected revenue;
    optimizing, by the computer of the parent organization, membership of the set, wherein the optimizing step comprises:
        determining a net impact on revenue for each of a plurality of non-members under consideration for the set, the plurality of non-members being outside of geographical protective areas of the top performing members in the set, the determining including evaluating a revenue that a non-member under consideration for the set is expected to pass to the parent organization; and
        identifying a candidate member to be included in the set based on the net impact on revenue, the candidate member being one of the plurality of non-members outside of the geographical protective areas of the top performing members in the set and, among the plurality of non-member outside of the geographical protective areas of the top performing members in the set, the candidate member yielding a highest value of the revenue expected to pass to the parent organization.

2. The method according to claim 1, further comprising:
    determining a geographical protective area for each of the top performing members.

3. The method according to claim 1, further comprising:
    repeating the optimizing step until an existing demand for an item in a geographic unit is satisfied by the set.

4. The method according to claim 1, wherein the expected revenue for a member in the set is determined based on a demand for an item in a geographic unit, a probability of sale by the member for the item in the geographic unit, an inventory of the item at the member, and a per-unit revenue passed on from the member to the parent organization when a sale is made.

5. The method according to claim 4, further comprising:
    determining a weight for each of a plurality of features utilized in determining the demand for the item in the geographic unit, the probability of sale of the item in the geographic unit by the member, the inventory of the item at the member, and the per-unit revenue passed on from the member to the parent organization when the sale is made.

6. The method according to claim 5, wherein the plurality of features includes a driving distance between a customer and the member and wherein the driving distance is weighted with respect to the geographic unit.

7. The method according to claim 4, wherein the item is a trim of a vehicle.

8. The method according to claim 1, further comprising:
    determining an expected revenue for each non-member under consideration for the set, wherein the expected revenue for a non-member is determined based on a demand for an item in a geographic unit, a probability of sale of the item in the geographic unit by the non-member, an inventory of the item at the non-member, and a per-unit revenue passed on from the non-member to the parent organization when a sale is made, wherein values for unknown features used in determining the probability of sale by the non-member and the inventory of the item at the non-member are imputed using average values for members having characteristics similar to the non-member, the characteristics including geographic information and demographic information.

9. The method according to claim 1, wherein the optimizing step further comprises:
removing any member in the set for which the expected revenue is zero.

10. The method according to claim 1, wherein the optimizing step further comprises:
removing any member in the set for which the expected revenue is equal to or less than a predetermined value or percentage.

11. A computer program product comprising at least one non-transitory computer-readable medium storing instructions translatable by a computer at a parent organization to perform:
determining an expected revenue that each member in a set is to pass to the parent organization;
identifying top performing members in the set utilizing the expected revenue;
optimizing membership of the set, wherein the optimizing step comprises:
determining a net impact on revenue for each of a plurality of non-members under consideration for the set, the plurality of non-members being outside of geographical protective areas of the top performing members in the set, the determining including evaluating a revenue that a non-member under consideration for the set is expected to pass to the parent organization; and
identifying a candidate member to be included in the set based on the net impact on revenue, the candidate member being one of the plurality of non-members outside of the geographical protective areas of the top performing members in the set and, among the plurality of non-member outside of the geographical protective areas of the top performing members in the set, the candidate member yielding a highest value of the revenue expected to pass to the parent organization.

12. The computer program product of claim 11, wherein the instructions are further translatable by the computer to perform:
repeating the optimizing step until an existing demand for an item in a geographic unit is satisfied by the set.

13. The computer program product of claim 11, wherein the expected revenue for a member in the set is determined based on a demand for an item in a geographic unit, a probability of sale by the member for the item in the geographic unit, an inventory of the item at the member, and a per-unit revenue passed on from the member to the parent organization when a sale is made.

14. The computer program product of claim 13, wherein the instructions are further translatable by the computer to perform:
applying a weight to each of a plurality of features utilized in determining the demand for the item in the geographic unit, the probability of sale of the item in the geographic unit by the member, the inventory of the item at the member, and the per-unit revenue passed on from the member to the parent organization when the sale is made.

15. The computer program product of claim 11, wherein the expected revenue for a non-member under consideration for the set is determined based on a demand for an item in a geographic unit, a probability of sale of the item in the geographic unit by the non-member, an inventory of the item at the non-member, and a per-unit revenue passed on from the non-member to the parent organization when a sale is made, wherein values for unknown features used in determining the probability of sale by the non-member and the inventory of the item at the non-member are imputed using average values for members having characteristics similar to the non-member, the characteristics including geographic information and demographic information.

16. The computer program product of claim 11, wherein the instructions are further translatable by the computer to perform:
removing any member in the set for which the expected revenue is zero.

17. The computer program product of claim 11, wherein the instructions are further translatable by the computer to perform:
removing any member in the set for which the expected revenue is equal to or less than a predetermined value or percentage.

18. A system, comprising:
a computer communicatively connected to a data store, the data store having information on members of a set; and
at least one non-transitory computer-readable medium storing instructions translatable by the computer to perform:
for each of the members in the set, determining an expected revenue to be passed to a parent organization, wherein the expected revenue is determined based on a demand for an item in a geographic unit, a probability of sale of the item in the geographic unit, an inventory of the item, and a per-unit revenue passed on to the parent organization when a sale is made;
identifying top performing members in the set utilizing the expected revenue;
optimizing membership of the set, wherein the optimizing step comprises:
determining a net impact on revenue for each of a plurality of non-members under consideration for the set, the plurality of non-members being outside of geographical protective areas of the top performing members in the set, the determining including evaluating a revenue that a non-member is expected to pass to the parent organization; and
identifying a candidate member to be included in the set based on the net impact on revenue, the candidate member being one of the plurality of non-members outside of the geographical protective areas of the top performing members in the set and, among the plurality of non-member outside of the geographical protective areas of the top performing members in the set, the candidate member yielding a highest value of the revenue expected to pass to the parent organization.

19. The system of claim 18, wherein the optimizing step further comprises:
removing any member in the set for which the expected revenue is equal to or less than a predetermined value or percentage.

20. The system of claim 18, wherein the instructions are further translatable by the computer to perform:
repeating the optimizing step until an existing demand for an item in a geographic unit is satisfied by the set.

* * * * *